United States Patent [19]

Düdeck et al.

[11] 4,344,318

[45] Aug. 17, 1982

[54] UNDESIRABLE COMBUSTION CHARACTERISTIC DETECTOR FOR SPARK-IGNITED INTERNAL COMBUSTION ENGINES

[75] Inventors: Ingo Düdeck, Weinstadt; Manfred Maass, Esslingen, both of Fed. Rep. of Germany

[73] Assignee: Daimler-Benz Aktiengesellschaft, Stuttgart, Fed. Rep. of Germany

[21] Appl. No.: 213,404

[22] Filed: Dec. 5, 1980

[30] Foreign Application Priority Data

Dec. 5, 1979 [DE] Fed. Rep. of Germany ....... 2948856

[51] Int. Cl.³ ............................................. G01L 23/22
[52] U.S. Cl. ....................................................... 73/35
[58] Field of Search ............................. 73/35; 123/425

[56] References Cited

U.S. PATENT DOCUMENTS 3,393,557 7/1968 Brown et al. ........................... 73/35

*Primary Examiner*—James J. Gill
*Attorney, Agent, or Firm*—Craig and Antonelli

[57] ABSTRACT

An apparatus for detecting undesirable combustion characteristics in spark-ignited internal combustion engines. A sensor and band-pass filter tuned to the frequency of the knock vibration are provided with an output of the band-pass filter being compared with a reference value. The result of the comparison is correlated with undesirable combustion characteristics to be recognized. A rectifier is provided for solid borne sound signals received by the sensor with the signals passing through the band-pass filter. The signal is rectified in the rectifier to a knock signal and a series circuit composed of a band-stop filter tuned to the frequency of the knock vibration, an r.m.s. rectifier, and an amplifier is provided by means of which the sound signal received by the sensor is converted into a reference signal. A comparator is provided when the reference signal and the knock signals are compared and an output signal is generated if the knock signal exceeds the reference signal. A time comparison member receives the output signal from the comparator, with the time comparison member transmitting a signal of a predetermined time duration if the time duration of the signal of the comparator is longer than the specific time duration set in the time comparison member.

7 Claims, 1 Drawing Figure

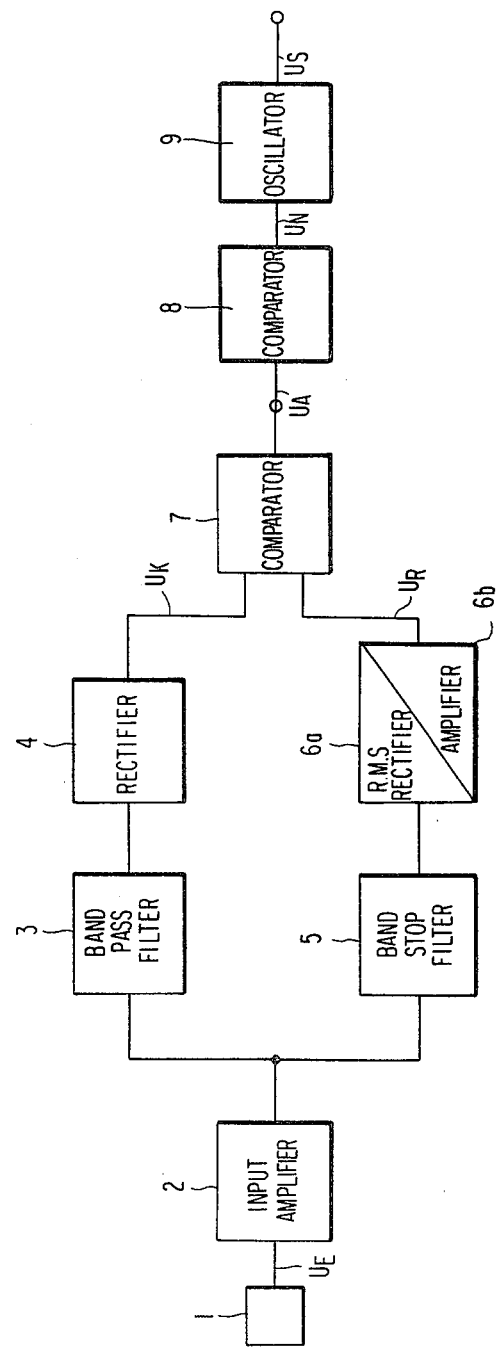

UNDESIRABLE COMBUSTION CHARACTERISTIC DETECTOR FOR SPARK-IGNITED INTERNAL COMBUSTION ENGINES

The present invention relates to a detection apparatus and, more particularly, to an apparatus for detecting undesirable combustion characteristics in spark-ignited internal combustion engines, which apparatus includes an acceleration sensor and a band-pass filter tuned to a frequency of a knock vibration of a engine, with an output signal of the band-pass filter being compared with a reference signal or value, and with the result of the comparison being correlated with the undesirable combustion characteristic to be recognized.

An arrangement of the aforementioned type is proposed in, for example, U.S. Pat. No. 4,012,942, wherein a second sensor produces a signal related or associated to the number of revolutions of the internal combustion engine. From the signal of the second sensor, the background noise reference signal is subtracted from the square of the output signal of the band-pass filter and thus forms a "knock intensity" signal. The "knock intensity" signal is compared with another speed dependent "knock" limit signal or value. As a result of this comparison, a signal is provided which permits a recognition of intensity and frequency of so-called "pinging" of the engine.

A disadvantage of the above-noted proposed arrangement resides in the fact that a relationship between the background noise and the speed of the engine is dependent on the type as well as on the particular engine involved. Consequently, what is required is an exact adjustment which must be repeated at regular intervals since it is inconstant due to mechanical, thermal, and other influences.

A further disadvantage of the above-mentioned proposed construction resides in the fact that two different sensors with differing sensitivities are employed and, as can readily be appreciated, variations in the two different sensors can adversely effect the measuring result.

In an attempt to avoid the above-noted disadvantages, a detection apparatus is proposed in German Patent Application No. P 29 23 056.6 and corresponding commonly assigned U.S. patent application Ser. No. 151,991 wherein an acceleration sensor and a band-pass filter tuned to the frequency of a knock vibration is provided, with an output value of the band-pass filter being compared with a reference value, and wherein a result of the comparison is correlated with the undesirable combustion characteristics to be recognized. A rectifier is provided for the solid-borne sound signal received by the acceleration sensor and having passed through the band-pass filter. This signal is rectified in the rectifier to a knock signal. A series circuit is provided made up of a band-stop filter tuned to the frequency of the knock vibration and of a root-mean-square (r.m.s.) rectifier and of an amplifier by means of which the solid-borne sound signal received by the acceleration sensor is converted into a reference signal. A comparator is provided wherein the reference signal and the knock signal are compared with each other, and an output signal is generated if the knock signal exceeds the reference signal.

In certain speed ranges, it is possible for engine noises to occur even without knocking. These noises with respect to the frequency range and intensity are relatively indistinguishable from the so-called "pinging" noises. With the above proposed arrangements, great difficulties may be encountered if, for example, with a six-cylinder in line engine, the operation or detection is to be conducted with only one sensor. Since the control system must not provide any response without a detection of a "pinging" the reference level must be adapted to the loudest "pinging-like" normal noise from the cylinder lying adjacent or next to the sensor. In adverse circumstances, even very strong "pinging" noises of more remote cylinders from the sensor may not exceed such normal noises.

The aim underlying the present invention essentially resides in providing an undesirable combustion characteristic detector for a spark-ignited thermal combustion engine which makes it possible to make a clear distinction between a "pinging" and other noises and also to render an indication of the intensity of the "pinging".

In accordance with advantageous features of the present invention, a time comparison member is connected to an output of the comparator with the time comparison member transmitting a signal of a predetermined duration if the duration of the signal of the comparator is longer than a specific duration of the time comparison member.

Advantageously, the duration of the signal transmitted by the comparison member is equal to a difference of a duration of the signal of the comparator minus the duration of the time comparison member.

Furthermore, in accordance with the present invention, the duration of the signal transmitted by the comparison member is counted out with the oscillations of a constant frequency of an oscillator.

It has been found through experimentation that the "pinging" knocks as contrasted to normal noises which occur during the operation of the internal combustion engine have a longer duration of several milliseconds. By virtue of the construction proposed by the present invention, this difference in duration enables the detection apparatus to make a clear distinction between "pinging" and other noises and also to provide an indication of the intensity of the pinging.

Accordingly, it is an object of the present invention to provide a detection apparatus for detecting undesirable combustion characteristics in a spark-ignited internal combustion engine which avoids, by simple means, shortcomings and disadvantages encountered in the prior art.

Another object of the present invention resides in providing a detection apparatus for detecting undesirable combustion characteristics in spark-ignited internal combustion engines which is simple in construction and therefore relatively inexpensive to manufacture.

Yet another object of the present invention resides in providing a detection apparatus for detecting undesirable combustion characteristics in spark-ignited internal combustion engines which functions realiably under all operating conditions.

A further object of the present invention resides in providing a detection apparatus for detecting undesirable combustion characteristics in spark-ignited internal combustion engines which clearly distinguishes between a "pinging" and other noises incident to the operation of an internal combustion engine.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a schematic block diagram of an apparatus for detecting undesirable combustion characteristics of spark-ignited internal combustion engines in accordance with the present invention.

Before describing, in detail, the particular improved detecting apparatus in accordance with the present invention, it should be observed that the present invention resides primarily in a novel structural combination of conventional components and not in the particular detailed configurations thereof. Accordingly, the structure, control, and arrangement of these conventional components are illustrated in the single FIGURE of the drawing by readily understandable block representations in order not to obscure the disclosure with structural details which would be readily apparent to those skilled in the art having the benefit of the description herein. Thus, the block diagram illustration of the single FIGURE of the drawings does not necessarily represent the mechanical structural arrangement of the exemplary system, but is primarily intended to illustrate the major structural components of this system in a convenient functional grouping so that the present invention can be more readily understood.

Referring now to the single FIGURE of the drawing, an acceleration sensor 1 such as, for example, a piezoelectric crystal transducer for absorbing solid-borne sound is arranged at a suitable place such as, for example, a cylinder head (not shown) of an internal combustion engine (not shown). The acceleration sensor 1 provides an output signal $U_E$ of the solid borne sound sensed thereby, with the output signal being fed to an input amplifier 2, the output of which is connected to a band-pass filter 3 and a band stop filter 5.

The band-pass filter 3 provides an output signal to a rectifier 4, with the band-stop filter 5 providing an output signal to an r.m.s. rectifier 6a and an amplifier 6b. The amplifier 6b may be a linear or non-linear amplifier, or, in certain applications, the amplifier 6b may be omitted.

An output signal $U_K$ of the rectifier 4 and an output signal $U_R$ of the amplifier 6b are connected to and form inputs of a comparator 7. The band-pass filter and band-stop filter are set to a knocking frequency of, for example, 7 KLz which represents the frequency range of the noise spectrum caused by "pinging". In other words, the band-pass filter 3 amplifies the knocking frequency and the band-stop filter 5 suppresses the knocking frequency.

The solid-borne sound signal $U_E$ of the acceleration sensor or pick-up 1 is raised in the input amplifier 2 to the required level and simultaneously fed to both the band-pass filter 3 and the band-stop filter 5. In band-pass filter 3, a signal having the knocking frequency, if present, is amplified and all other frequencies are attenuated. The signal from the band-pass filter 3 is rectified in the rectifier forming an output or knock signal $U_K$.

In the band-stop filter 5, the signal having the knocking frequency is attenuated. After passing through the r.m.s. rectifier 6a, the residual signal components form the mean value of the solid-borne sound signal, with this value representing, after linear amplification in the amplifier 6b, a threshold value for the knock signal which represents an output or reference signal $U_R$.

The signal $U_A$ and $U_R$ from the rectifier 4 and linear amplifier 6b are fed and compared with each other in the comparator 7. If the output or knock signal $U_K$ exceeds the reference signal $U_R$, the comparator 7 yields an output signal $U_A$.

The comparator 7 yields a signal $U_A$ in all cases where, with the input signal $U_E$, vibrations of the knocking frequency range are received and those vibrations exceed a certain level with respect to the remaining frequencies. Since a relative comparison takes place in the comparator 7, a constant adjusting of the detecting apparatus is unnecessary.

A time comparison member 8 is connected to the comparator 7 and receives the signal $U_A$. The time comparison member is adapted to transmit a signal $U_N$ if a duration $t_A$ of the output signal $U_A$ from the comparator 7 is longer than a duration $t_E$ preset in the time comparison member 8. The output signal $U_N$ of the time comparison member has a duration $t_N$ which preferably corresponds to a difference between the duration $t_A$ of the output signal $U_A$ and the duration $t_E$ set in the time comparison member 8 ($t_A - t_E$) and is employed to provide a measure for the intensity of the "pinging".

To determine the duration $t_N$ of the signal $U_N$ transmitted by the time comparison member 8, an oscillator is provided for transmitting oscillations at a constant frequency. The oscillations from the oscillator 9 are counted during the duration $t_N$ and represent a digital measure for the "pinging" intensity and may also serve as an input variable for an engine control device so as to, for example, shift the ignition timing in a known manner.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An apparatus for detecting of unesirable combustion characteristics in a spark-ignited internal combustion engine, the apparatus including a sensor means for sensing a solid-borne sound signal and for providing an output signal thereof, and a band-pass filter means tuned to an engine knock vibration frequency, the output signal of the sensor means being fed to the by-pass filter means, a rectifier means for rectifying a signal received from the band-pass filter means to an engine knock signal, means for converting the output signal from the sensor means into an engine knock reference signal, and a comparator means for comparing the engine knock signal with the engine knock reference signal and for providing an output signal if the knock signal exceeds the knock reference signal, characterized in that comparing means are provided for receiving the output signal from the comparator means and for providing an output signal of a predetermined time duration if a time duration of the output signal of the comparator means is longer than a specific preset time duration of the comparing means.

2. An apparatus according to claim 1, characterized in that the time duration of the output signal of the comparing means is equal to the difference between the time duration of the output signal of the comparator means minus the specific preset time duration of the comparing means.

3. An apparatus according to claim 1, characterized in that means are provided for determining the time duration of the output signal from the comparing means and for providing an output control signal to an engine control means.

4. An apparatus according to claim 3, characterized in that the determining means is a constant frequency oscillator means which enables the time duration of the output signal from the comparing means to be counted out by the oscillations of the oscillator means.

5. An apparatus according to one of claims 2, 3 or 4, characterized in that the converting means includes a band-stop filter means tuned to a frequency of the knock vibration and an r.m.s. rectifier means arranged in series with the band-stop filter means, and in that the output signal of the sensor means is fed to the band-stop filter means and an output signal from the band-stop filter means is fed to the r.m.s. rectifier means.

6. An apparatus according to claim 5, characterized in that the converting means further includes an amplifier means for amplifying an output signal of the r.m.s. rectifier means and for providing an output signal to the comparator means.

7. An apparatus according to claim 6, characterized in that an input amplifier means is disposed between the sensor means and the band-pass filter means and band-stop filter means for amplifying the output signal of the sensor means prior to an output signal being fed to the band-pass filter means and band-stop filter means.

* * * * *